United States Patent [19]

Yamamoto et al.

[11] 4,259,861
[45] Apr. 7, 1981

[54] METHOD AND APPARATUS FOR DETERMINING WHETHER A FLUID IS LEAKING

[75] Inventors: Hajime Yamamoto; Shigehiro Shimoyashiki, both of Hitachi, Japan

[73] Assignee: Hitachi, Ltd., Tokyo, Japan

[21] Appl. No.: 60,767

[22] Filed: Jul. 26, 1979

[30] Foreign Application Priority Data

Aug. 7, 1978 [JP] Japan ................... 53-95478

[51] Int. Cl.$^3$ ............................................ G01M 3/00
[52] U.S. Cl. .................................. 73/40.5 R; 73/15 R
[58] Field of Search ............... 73/40.5 R, 40, 46, 61.3, 73/15 R, 204

[56] References Cited

U.S. PATENT DOCUMENTS

| 3,874,222 | 4/1975 | Ladd et al. | 73/40.5 R |
| 3,938,544 | 2/1976 | Bernaerts | 73/204 X |
| 4,041,771 | 8/1977 | Allan et al. | 73/40.5 R |

FOREIGN PATENT DOCUMENTS 45254  10/1977  Japan .

*Primary Examiner*—Gerald Goldberg
*Assistant Examiner*—Joseph W. Roskos
*Attorney, Agent, or Firm*—Thomas E. Beall, Jr.

[57] ABSTRACT

An electrically conductive metal is arranged within a passage for sodium having leaked, and the temperature change of the electrically conductive metal attributed to the heat of vaporization of which the sodium mist deprives the electrically conductive metal upon contact with the latter and subsequent vaporization is detected. The temperature change of the electrically conductive metal is detected in the form of a change in the current or voltage conducting property, and current corresponding to the temperature change is fed back to the electrically conductive metal. The change of the conducting property is taken out as a pulse signal, and a value proportional to the weight of a sodium mist particle is detected from the magnitude of the signal. Further, a value proportional to the weight of the whole mist is detected by the pulse height analysis. The leakage of the sodium is decided by comparing the value of the weight of the whole mist with a predetermined value. The sodium leakage may well be decided by comparing the number of the pulse signals with another predetermined value.

13 Claims, 7 Drawing Figures

METHOD AND APPARATUS FOR DETERMINING WHETHER A FLUID IS LEAKING

BACKGROUND OF THE INVENTION

This invention relates to a method and apparatus for determining whether a container fluid is leaking. More particularly, it relates to a method and apparatus for determining at an early stage the leakage of minute sodium from a sodium container, for example, cooling pipe in a sodium-cooled fast breeder.

Heretofore, in a sodium-cooled fast breeder, e.g. leakage detection apparatus as disclosed in Japanese Utility Model Publication No. 45254 published in 1977, has been employed in order to prevent a large quantity of sodium from leaking from a cooling pipe. In this apparatus, two electrodes are disposed between the sodium pipe and a heat insulating pipe outside the former pipe, and the situation of short-circuit between the electrodes is monitored with a resistance meter, whereby the presence of the leakage of sodium is detected. Accordingly, there are the following disadvantages. (1) The leakage is decided in reliance on a conduction or non-conduction signal between the two electrodes alone, so that when a place of the leakage is distant from the mounting positions of the electrodes, it will not be detected unless a large amount of sodium leaks. That is, the apparatus is incapable of finding the leakage at an early stage and it is feared to incur a serious leakage accident. (2) The sodium that has once short-circuited the electrodes does not separate from the electrode portion, and sometimes solidifies as it adheres to the electrodes. Therefore, once the apparatus has operated, it cannot restore the performance as a detector. Accordingly, the apparatus cannot continuously detect sodium which is continuously leaking.

SUMMARY OF THE INVENTION

An object of this invention is to provide a method and apparatus which are free from the disadvantages of the prior art and which can detect the leakage of a very small quantity of fluid such as sodium at an early stage and with a high reliability.

Features and effects of this invention are as follows:

(1) An electrically conductive metal is arranged within a passage for sodium having leaked, and the temperature change of the electrically conductive metal attributed to the heat of vaporization of which the sodium mist deprives the electrically conductive metal upon contact with the latter and subsequent vaporization is detected. As a result, a very small quantity of sodium can be detected by the mere contact of the sodium mist with the electrically conductive metal, and the continuous detection is possible because the sodium mist is vaporized from the surface of the electrically conductive metal.

(2) The temperature change of the electrically conductive metal is detected in the form of a change in the current or voltage conducting property, and current corresponding to the temperature change is fed back to the electrically conductive metal. As a result, the electrically conductive metal can be restored to the original temperature to remove the temperature change in a short time.

(3) The change of the conducting property is taken out as a pulse signal, a value proportional to the weight of a sodium mist particles is detected from the magnitude of the signal, and a value proportional to the weight of the whole mist having contacted with the electrically conductive metal is detected by the pulse height analysis. As a result, a precise judgment can be made as to whether or not the fast breeder is to be shut down.

DETAILED DESCRIPTION OF THE EMBODIMENTS

Figure 1:
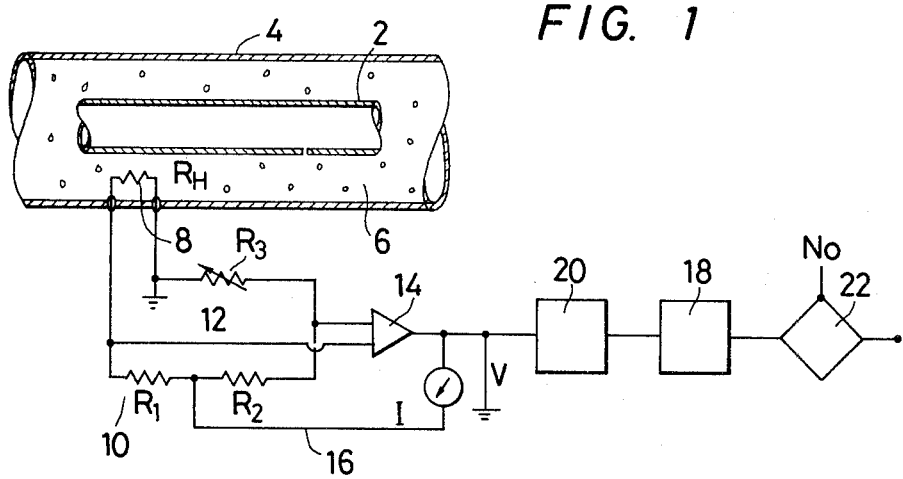
FIG. 1 is a circuit arrangement diagram showing an embodiment of sodium leakage-detecting apparatus according to this invention.

Hereunder, embodiments of this invention will be described in detail with reference to the drawings. FIG. 1 shows the circuit arrangement of apparatus for determining the leakage of sodium from a cooling pipe in a sodium-cooled fast breeder. In the arrangement of FIG. 1, sodium is flowing inside a cooling pipe 2. A pipe 4 lies outside the cooling pipe 2, to form a heat insulating space 6 between both the pipes 2 and 4. A sensor 8 for detecting sodium mist is disposed within the heat insulating space 6. The sensor 8 is made of an electrically conductive metal having a small thermal capacity, and is shaped into a wire or film. The sensor 8 is a resistor $R_H$ included in a control circuit 10. The control circuit 10 detects a temperature fall of the sensor 8 occurring when the sodium mist vaporizes upon collision against the sensor 8, as a decrease in the electric resistance $R_H$ of the sensor 8, and generates a signal corresponding to the temperature change. It also functions to restore the temperature of the sensor 8 to its original value in a short time. The control circuit is made up of a bridge circuit 12 which has the sensor 8 or the resistor $R_H$ as one arm thereof, and a current feedback circuit 16 which includes a current amplifier 14 for current-amplifying an unbalanced voltage developing in the bridge circuit 12 due to the temperature change of the sensor 8 and which serves to bring a current from the current amplifier 14 back to the bridge circuit 12. The bridge circuit 12 is composed of the resistor $R_H$ of the sensor 8, two fixed resistors $R_1$ and $R_2$ and a variable resistor $R_3$, and is put into a balanced state ($R_1 \cdot R_3 = R_3 \cdot R_H$) in advance. The temperature of the sensor 8 is held higher than that of the sodium mist.

In case where the sodium has leaked, the sodium mist passes through the heat insulating space 6 and collides on the surface of the sensor 8. Since the temperature of the sodium mist is lower than that of the sensor 8, the sodium is heated to vaporize. The sensor 8 is deprived of the heat of vaporization of the sodium, to have its temperature lowered and simultaneously to have its electric resistance $R_H$ reduced. In consequence, an unbalanced voltage Δe develops across two terminals of the bridge circuit 12 that are connected to amplifier 14. The current amplifier 14 subjects the unbalanced voltage Δe to current amplification, and the amplified current I is fed back to the bridge circuit 12. When the respective resistances in the bridge circuit 12 are set in advance so that $R_1 + R_H < R_2 + R_3$ may hold, most of the feedback current I flows on the side of the sensor 8 and is used for the Joule heating of the sensor 8. Therefore, the temperature of the sensor 8 rises in a short time again, and the electric resistance $R_H$ increases. Until the bridge circuit 12 gets balanced again owing to the restoration of the electric resistance $R_H$ to its original value, the feedback current I is supplied to the bridge circuit 12. The response rate in this interval, in other words, the period of time taken until the bridge circuit 12 is balanced is approximately equal to the inverse number of the gain $g_m$ ($=I/\Delta e$) of the current amplifier 14. A response rate corresponding to $g_m = 10^5$, i.e., on the order of 10μ seconds can be readily attained. In this case, in order to raise the detection sensitivity, the resistance $R_H$ of the sensor 8 at the balance of the bridge is made as high as possible. That is, the temperature of the sensor 8 is made high. This is performed by increasing the variable resistance value $R_3$.

Figure 2:
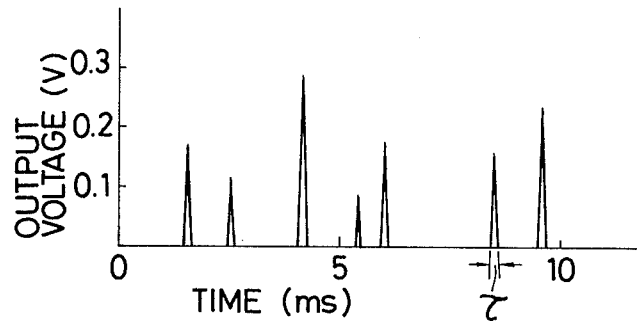
FIG. 2 is a graph showing voltage pulse signals detected by a photocorder installed in the circuit of FIG. 1.

In a counter 18, the number of pulse signals V being output voltages of the control circuit 10 is counted for a fixed time. The signal to be counted by the counter 18 may well be the feedback current I. FIG. 2 shows the waveforms of voltage signals V which were observed with a photocorder 20 when the mist collided against the sensor 8 formed of a tungsten wire having a diameter of 5 μm and a length of 1 mm. In this case, the resistances were $R_1 = 10$ Ω, $R_2 = 100$ Ω, $R_3 = 100$ Ω and $R_H = 10$ Ω, the temperature of the sensor 8 was 330° C., the current gain was $g_m = 10^4$, the temperature of the sodium mist was about 150° C., and the particle size of the mist was 10-20 μm. As illustrated in FIG. 2, a clear voltage pulse signal is generated each time a particle of the mist collides with the sensor 8. The counting of the number of the pulses can be satisfactorily effected with a known technique.

The number N (/second) of the voltage signals V counted by the counter 18 for the fixed time enters a comparator 22, and is compared with a predetermined value $N_o$ (/second) here. In case where $N \geq N_o$ holds, it is decided that the leakage of the sodium has occurred.

Figure 3:
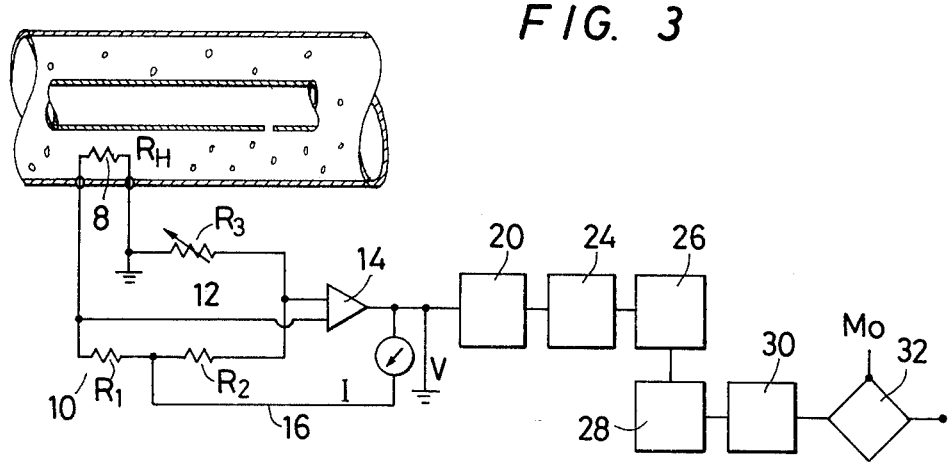
FIG. 3 is a circuit arrangement diagram showing another embodiment of the sodium leakage-detecting apparatus according to this invention.

FIG. 3 shows another embodiment. This embodiment decides the leakage by evaluating quantitatively the amount of leaking sodium mist and comparing the evaluated amount with a predetermined value. More specifically, in deciding the leakage, the embodiment shown in FIG. 1 relies only on the number of sodium mist particles, whereas the embodiment of FIG. 3 takes also the sizes of the sodium mist particles into account and assesses the amount of leaking sodium in terms of weight.

The feature of this embodiment is that the weight of one mist particle of sodium having collided with the sensor 8 is calculated from the magnitude of the pulse signal V based on the change of the voltage or current in the control circuit 10, and that the weight of the whole mist is calculated by the pulse height analysis, the resultant value being compared with a predetermined value.

In FIG. 3, the control circuit 10 is identical to that shown in FIG. 1, and the same elements are assigned the same symbols.

Assuming now that a mist particle having a diameter d (μm) continues to vaporize after colliding against the sensor 8 and adhering thereto, the heat of vaporization $E_o$ of which the mist particle deprives the sensor 8 till completion of the vaporization is expressed by:

$$E_o = \frac{\pi}{6} d^3 \rho \{c(T_H - T_P) + h\} \times 10^{-12}$$

where
ρ: density of the mist,
c: specific heat of the mist,
$T_H$: temperature of the sensor,
$T_P$: temperature of the mist, and
h: heat of vaporization of the mist.

On the other hand, the quantity of heat $Q_i$ which is supplied to the sensor 8 in the interval is expressed with the feedback current I or the output voltage V of the control circuit 10 as follows:

$$Q_i = \int_0^T R_H (I^2 - I_o^2) dt$$

$$= \int_0^T \frac{R_H}{(R_1 + R_H)^2} (V^2 - V_o^2) dt$$

where
$I_o$: current which is supplied to the sensor in the absence of the mist,
$V_o$: output voltage in the absence of the mist, and
τ: period of time taken till the completion of the vaporization after the collision of the mist. Since the temperature of the sensor is restored to its original magnitude, $Q_i = E_o$ holds. Besides, all the resistance $R_H$ and the material property values ρ, c and h are determined by the sensor temperature. From the aforecited two equations, the relationship between the diameter d of the mist particle and the output voltage V is obtained as follows:

$$d^3 = \kappa \int_0^T (V^2 - V_o^2) dt$$

where $$\kappa = \frac{6 \times 10^{12} \times R_H}{\pi (R_1 + R_H)^2 \rho \{c(T_H - T_P) + h\}}$$

Accordingly, the value obtained by squaring the output voltages V and then integrating the squared output voltages increases in proportion to the cube of the diameter of the colliding mist particles, that is, in proportion to the weight of the mist.

In the present embodiment, therefore, the voltage signals V are firstly applied to a squaring unit 24 and subsequently to an integrating unit 26. As a result, the voltage signals V are transformed into a squared and integrated value $$S_i = \int_0^T V^2 dt.$$

As previously stated, the squared and integrated value $S_i$ is a quantity proportional to the Joule heat $Q_i$ which is supplied to the sensor 8 at the collision of the mist, that is, the heat $E_o$ of which the colliding mist deprives the sensor 8. Accordingly, this value is also proportional to the weight of the colliding mist.

The squared and integrated signal $S_i$ is sent to a pulse height analyzer 28, in which the pulse height distribution of the signals observed within a fixed time or the number $N_i$ of the mist particles colliding against the sensor 8 within the fixed time is evaluated for each squared and integrated value $S_i$. Further, the total weight $$M (\alpha \sum_{i=0}^{n} S_i N_i)$$

of the mist having collided against the sensor 8 is calculated in a calculator 30 and is put into a comparator 32. In the comparator 32, the occurrence of leakage is decided in case where the total weight M of the colliding mist has exceeded a predetermined quantity $M_o$.

Figure 4:
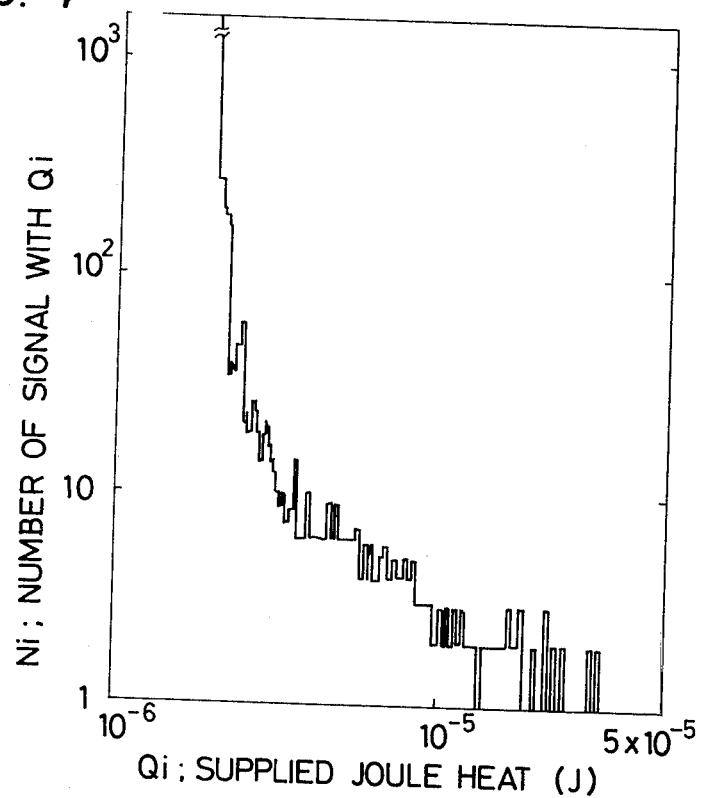
FIG. 4 is a graph showing the result of the pulse height analysis of pulse signals in FIG. 2 by a pulse height analyzer installed in the circuit of FIG. 3, and FIGS. 5(a), 5(b) and 5(c) are sectional views of embodiments each showing a state in which an electrically conductive metal for detecting sodium is arranged in a detecting portion.

Here, since the squared and integrated value $S_i$ of the voltage signals V is proportional to the Joule heat $Q_i$ as stated before, it is also allowed that the number $N_i$ of the mist particles colliding against the sensor 8 within the fixed time is obtained for each Joule heat $Q_1$, whereupon the total weight $$M (\alpha \sum_{i=1}^{n} Q_i N_i)$$

of the mist is calculated by means of the calculator 30. FIG. 4 shows a pulse height distribution which is expressed by $Q_i$ (supplied Joule heat) and $N_i$ (number of signals with $Q_i$). A value obtained by the areal integration of the distribution curve with the calculator 30 is proportional to the total weight M.

Now, examples of the sensor will be described. The material and shape of the sensor are selected so as to satisfy the following conditions:

(i) The material is electrically conductive, and its resistance varies greatly versus the temperature variation of the sensor. That is, the resistivity is high.

(ii) The material can endure the contact with sodium which exhibits a high chemical activity. It can also endure uses under high temperatures. In particular, the mechanical strength is high.

(iii) In order to make great the temperature change of the sensor at the collision of the mist, the thermal capacity of the sensor can be made small. The surface area can be made large so as to raise the probability of the collision with the mist.

Figure 5:
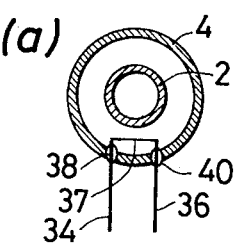
Figure 5:
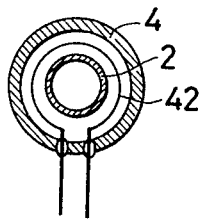
Figure 5:
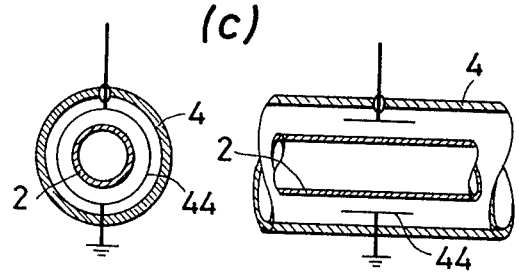

While any material fulfilling the above conditions is applicable, tungsten or nickel is especially desirable. Regarding the shape, a wire being 5–10 μm thick or a film being 1–10 μm thick which can be fabricated by a known technique is suitable. FIGS. 5(a), 5(b) and 5(c) illustrate examples in which various sensors are mounted on pipes. In the example of FIG. 5(a), two leads 34 and 36 are coupled by a metallic wire 37 rectilinearly. Parts 38 and 40 in which the respective leads 34 and 36 penetrate through the heat insulating pipe 4 are electrically insulated. This shape is favorable in the thermal capacity and the mechanical strength, but has the disadvantage of a small surface area. The example of FIG. 5(b) is a modification of the example of FIG. 5(a), and has a structure in which a metallic wire 42 surrounds the sodium pipe 2 to the end of increasing the surface area. In this case, the thermal capacity and the mechanical strength are not so good as in the example of FIG. 5(a). The example of FIG. 5(c) adopts a metallic film instead of the metallic wire. The metallic film 44 surrounds the sodium pipe 2 as in FIG. 5(b). In this example, the heat insulating pipe 4 is employed as one lead (earth terminal (E)), while the other lead penetrates through the heat insulating pipe 4. In this case, the mechanical strength and the surface area are favorable, but there is the disadvantage that the thermal capacity is large.

What is claimed is:

1. A method for determining whether a fluid is leaking from a container, comprising the steps of
    (a) arranging an electrically conductive metal outside a container of the fluid,
    (b) raising the temperature of said electrically conductive metal to the extent that the fluid vaporizes upon contact with said electrically conductive metal, and
    (c) detecting a temperature change of said electrically conductive metal based on the heat of the vaporization of the fluid contacting and vaporizing on said electrically conductive metal.

2. A method according to claim 1, wherein said step of raising includes causing current to flow through said electrically conductive metal, and said step of detecting determines the conductivity change of said electrically conductive metal.

3. The method as defined in claim 2, wherein said conductivity change is determined by detecting a change in an electric current value.

4. The method as defined in claim 2, wherein said conductivity change is determined by detecting a change in a voltage value.

5. The method as defined in claim 2, wherein said step of detecting generates an electric pulse signal in a control circuit with each fluid particle contacted with said electrically conductive metal, counts the number of pulse signals generated by the conductivity change, and compares the count value with a fixed value.

6. A method for determining whether a fluid is leaking from a container, comprising the steps of:
    (a) arranging a bridge circuit outside the container with one resistor in said bridge circuit being situated to intercept a stream of discrete particles of the fluid leaking outside said container,
    (b) raising the temperature of said one resistor to the extent that said fluid vaporizes upon contact with said one resistor and so that said bridge circuit is in a balanced state,
    (c) detecting a temperature change of said one resistor based on heat loss due to the vaporization of intercepted fluid particles, in the form of an unbalanced voltage appearing in said bridge circuit,
    (d) feeding current generated by the unbalanced voltage back to said bridge circuit so as to restore said bridge circuit to the balanced state again,
    (e) generating pulse signals by a change in one of the unbalanced voltage and the feedback current,
    (f) counting the number of said pulse signals, and
    (g) comparing the count value with a fixed value and producing a comparative signal.

7. A method according to claim 6, further including the steps of:
    cooling a nuclear reactor with liquid sodium so that said fluid is liquid sodium;

providing said container in the form of a pipe filled with the liquid sodium;

surrounding said pipe with a second spaced apart pipe to provide an annular heat insulating space between said pipes that is normally free of any substantial quantities of sodium, and which will receive therein sodium leaking from the first-mentioned pipe; and locating said one resistor within said heat insulating space and the remainder of said bridge circuit exteriorly of said pipes.

8. A method for determining whether a fluid is leaking from a container, comprising the steps of:
    (a) arranging a bridge circuit outside the container with one resistor in said bridge circuit being situated to intercept a stream of discrete particles of the fluid leaking outside said container,
    (b) raising the temperature of said one resistor to the extent that said fluid vaporizes upon contact with said one resistor and so that said bridge circuit is in a balanced state,
    (c) detecting a temperature change of said one resistor based on the heat loss due to the vaporization of intercepted fluid particles, in the form of an unbalanced voltage appearing in said bridge circuit 12,
    (d) feeding current generated by the unbalanced voltage back to said bridge circuit so as to restore said bridge circuit to the balanced state again,
    (e) generating pulse signals correlated to the intercepted particles by a change in one of the unbalanced voltage and the feedback current,
    (f) calculating values proportional to the weights of particles of the fluid having contacted with said one resistor, from the magnitude of the pulse signals,
    (g) counting the number of pulse signals,
    (h) calculating a value proportional to the weight of the whole fluid having contacted with said one resistor, from the values proportional to the weights of the particles and the number of the counted pulse signals, and
    (i) comparing the value proportional to the weight of the whole fluid with a fixed value and producing a comparative signal.

9. The method as defined in claim 8, further including the steps of:
    cooling a nuclear reactor with liquid sodium so that said fluid is liquid sodium;
    providing said container in the form of a pipe filled with the liquid sodium;
    surrounding said pipe with a second spaced apart pipe to provide an annular heat insulating space between said pipes that is normally free of any substantial quantities of sodium, and which will receive therein sodium leaking from the first-mentioned pipe; and locating said one resistor within said heat insulating space and the remainder of said bridge circuit exteriorly of said pipes.

10. An apparatus for determining whether a fluid is leaking from a container, comprising:
    (a) an electrically conductive metal arranged outside the container,
    (b) control circuit means feeding current to said electrically conductive metal to restore said electrically conductive metal to its original temperature to remove a temperature change thereof in a short time and provide a signal corresponding to the temperature change,
    (c) counter means counting the number of the signals provided from said control circuit means, and
    (d) comparator means which compares the number of the signals counted by said counter means with a fixed value and produces a comparative signal.

11. An apparatus for determining whether a fluid is leaking from a container, comprising:
    (a) an electrically conductive metal arranged outside the container to intercept discrete particles of the fluid that have leaked from the container,
    (b) control circuit means which feeds current to said electrically conductive metal to restore said electrically conductive metal to its original temperature to remove a temperature change thereof in a short time caused by intercepting a fluid particle and provide a signal corresponding to the temperature change,
    (c) first calculator means which calculates from said signal an output value proportional to the weight of a mist particle of the fluid that was intercepted to cause the signal,
    (d) pulse height analyzer means which counts a number of signals corresponding to the values proportional to the weights obtained by said first calculator means and produces a count output,
    (e) second calculator means which calculates an output value proportional to a total weight of the fluid having contacted with said electrically conductive metal, from the putput value of said first calculator means and the count output of said pulse height analyzer means, and
    (f) comparator means which compares the output value of said second calculator means with a fixed value and produces a comparative output.

12. The apparatus as defined in claim 10 or claim 11, wherein said control circuit means includes a bridge circuit which has said electrically conductive metal as one arm thereof, and means which feeds back to said bridge circuit current corresponding to an unbalanced voltage appearing in said bridge circuit.

13. The apparatus as defined in claim 12, wherein said control circuit means provides its signal as a voltage pulse signal, and produces Joule heat in said electrically conductive metal with the current supplied to said electrically conductive metal when the particle contacts therewith; and said first calculator means calculates a Joule heat value proportional to the weight of the mist particle.

* * * * *